July 5, 1927.

J. F. HOLLENBACK 1,634,872

CATTLE GUARD FOR RAILWAYS

Filed Dec. 29, 1925

Inventor
J. F. Hollenback,

By Clarence A. O'Brien
Attorney

Patented July 5, 1927.

1,634,872

UNITED STATES PATENT OFFICE.

JOSEPH F. HOLLENBACK, OF CANYON CREEK, MONTANA.

CATTLE GUARD FOR RAILWAYS.

Application filed December 29, 1925. Serial No. 78,180.

My present invention pertains to cattle guards such as employed in railways; and it contemplates the provision of a cattle guard which without being unduly expensive is possessed of the eminently practical advantages hereinafter ascribed to it.

To the attainment of the foregoing, the invention consists in the improvement as hereinafter described and definitely claimed.

In the accompanying drawings, forming part of this specification:—

Figure 2 is an enlarged fragmentary longitudinal vertical section illustrative of an important characteristic of my novel cattle guard hereinafter explicitly referred to.

Similar numerals of reference designate corresponding parts in all of the views of the drawings.

Among other elements my novel cattle guard comprises anchor members 1, four in number, and adapted to be superposed on ties and fixed thereto through the medium of spikes or analogous devices designated by 2. The said anchor members have beveled portions 3 which will offer no appreciable obstruction to beams or appurtenances pendent from trains and hence will not be liable to catch into such beams or appurtenances. At the higher ends of the said beveled portions 3 the anchors are provided with bifurcated portions 4 having alined apertures 5 in their arms.

Figure 1:
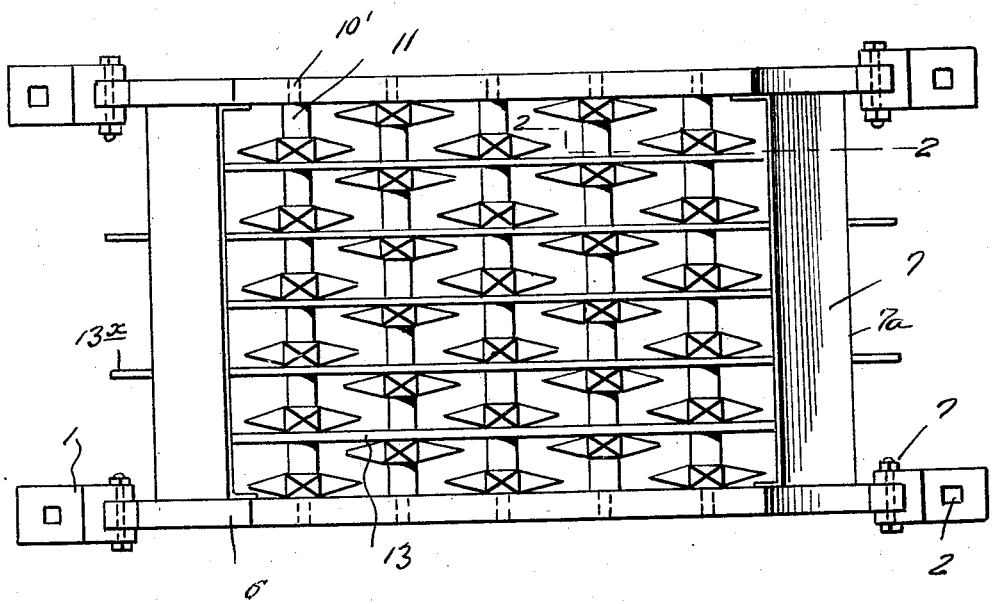
Figure 1 is a top plan view of the cattle guard constituting the best practical embodiment of my invention that I have as yet devised.

The said anchor members are relatively arranged as shown in Figure 1, and are for the detachable connection of the side bars 6 of the guard, the said side bars having their ends disposed removably in the anchor members 1, specifically speaking in the said bifurcation, and being detachably connected by bolts 7 to the anchor members so that when said bolts 7 are removed the cattle guard as a whole may be readily disassociated from the anchor members for repair purposes or for any other purpose. Likewise the said anchor members render it feasible to readily secure in position the major portion of the cattle guard which includes the said side bars 6.

Figure 2:
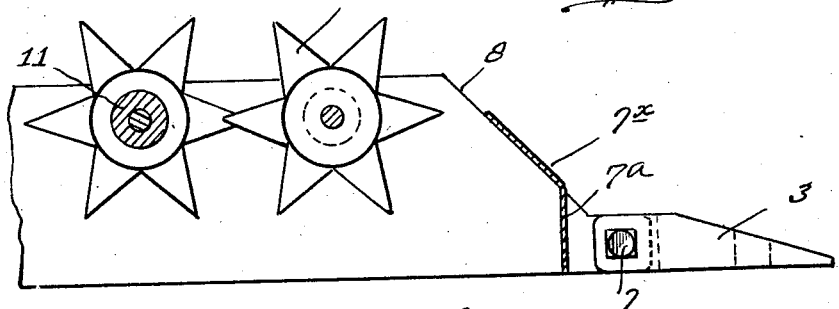
Figure 3:
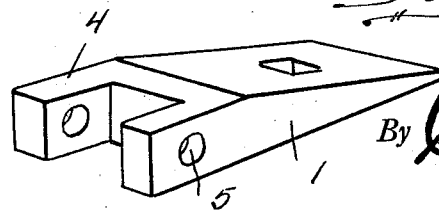
Figure 3 is an enlarged detail perspective showing one of the anchor members which constitute important features of the improvement.

Interposed between and fixed to the said side bars 6 are transverse end members 7$^a$ which have the inclined upper portions 7$^x$, Figure 2, designed to offer practically no obstruction to elements pendent from a train. In this connection it will also be noticed that the ends of the side bars 6 are beveled as designated by 8 for the general purpose ascribed to the inclined surfaces 3 and 7$^x$.

Extending between and carried by preference in a removable manner by the side bars 6 are transverse shafts 10 on which are spacing sleeves 11 and toothed wheels 12, the said wheels 12 being freely revoluble about their respective shafts and being arranged in staggered or lapped relation as appears in Figure 1 so as to lessen the liability of cattle catching their feet in the cattle guard. The free revolubility of the wheels 12 is also advantageous inasmuch as it enables the cattle guard to clear itself of snow, cinders and the like so that there is no liability under any condition of the guard becoming clogged and impaired. For contributing to lessening of the liability of cattle catching their feet in the guard, the guard also includes spaced longitudinal, vertically disposed plates or bars 13 and 13$^x$, the said plates or bars 13 and 13$^x$ separating the wheels 12 into longitudinal series so that by virtue of the bars or plates 13 and 13$^x$ in combination with the staggered arrangement of the wheels 12 it is practically impossible for cattle to be caught in the guard, but notwithstanding this there is free clearance through all of the guard between the side bars 6 and the end members 7$^x$ for the gravitation of snow, cinders and any other substance that would be expected to impair the efficiency of the guard.

The bars or plates 13$^x$ are adapted to reach downwardly to and rest upon sleepers or ties so as to strongly maintain the guard and prevent downward deflection of the same in the event of any considerable weight being imposed on the guard. These bars or plates 13$^x$ extend below bars or plates 13 and the bars 13 do not extend down far enough to touch the ties.

Manifestly when necessity demands two of the bolts may be removed and thereupon the major portion of the guard may be raised in hinged manner on the other two bolts to facilitate cleaning under the guard. Again when the side bars 6 are disassociated from the anchor members 1, any one of the shafts 10 may be removed for repair purposes or for the purpose of replacing a worn or broken wheel by a fresh wheel, and when nuts are employed in conjunction with the said shafts 10, the operation indicated may be readily carried out after removal of the nuts. It will further be appreciated that the relative arrangement of the wheels 12 is advantageous inasmuch as the said wheels are adapted to cut their way through ice, snow and the like so that under all conditions the efficiency of the guard will be maintained at a high standard.

Notwithstanding the many practical advantages of which my novel guard is possessed, the guard constructed in the manner shown and described is not unduly expensive, and is, in fact, in proportion to its durability inexpensive.

As before indicated the construction illustrated and described constitutes the best practical embodiment of my invention of which I am cognizant and I therefore prefer to employ the said construction. I do not desire, however, to be understood as confining myself to the construction and relative arrangement of the elements as disclosed, my invention being defined by my appended claims within the scope of which structural changes and changes in arrangement may be made without departure from my invention.

Having described my invention, what I claim and desire to secure by Letters-Patent, is:—

A cattle guard comprising anchor members adapted to be affixed on sleepers or ties, a pair of side bars engaged with the anchor members, said side bars having beveled ends, transverse end members interposed between and fixed to the side bars and having inclined portions, longitudinal spaced plates disposed between the side bars and interposed between and fixed to the end members, some of said plates being depended below the side bars and other plates to rest on sleepers and ties and constitute auxiliary supports, and means calculated to discourage cattle from traversing the guard disposed between the sides and the longitudinal plates.

In testimony whereof I affix my signature.

J. F. HOLLENBACK.